United States Patent
Du et al.

(10) Patent No.: US 10,199,654 B2
(45) Date of Patent: Feb. 5, 2019

(54) GRAPHENE COMPOSITE, METHOD FOR PRODUCING GRAPHENE COMPOSITE AND ELECTRODE FOR LITHIUM ION BATTERY CONTAINING GRAPHENE COMPOSITE

(71) Applicant: TORAY INDUSTRIES, INC., Tokyo (JP)

(72) Inventors: Ning Du, Shanghai (CN); Jian Wang, Shanghai (CN); Peiyu Sun, Shanghai (CN); Eiichiro Tamaki, Otsu (JP); Yasuo Kubota, Otsu (JP); Koki Miyazono, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 15/117,361

(22) PCT Filed: Feb. 9, 2015

(86) PCT No.: PCT/CN2015/072542
§ 371 (c)(1),
(2) Date: Aug. 8, 2016

(87) PCT Pub. No.: WO2015/120785
PCT Pub. Date: Aug. 20, 2015

(65) Prior Publication Data
US 2016/0351908 A1   Dec. 1, 2016

(30) Foreign Application Priority Data

Feb. 14, 2014   (CN) .......................... 2014 1 0050901

(51) Int. Cl.

| | |
|---|---|
| H01B 1/04 | (2006.01) |
| H01B 1/24 | (2006.01) |
| H01M 4/62 | (2006.01) |
| C09D 5/24 | (2006.01) |
| H01M 4/505 | (2010.01) |
| H01M 4/58 | (2010.01) |
| C01B 32/192 | (2017.01) |
| H01M 10/052 | (2010.01) |

(52) U.S. Cl.
CPC ........... *H01M 4/625* (2013.01); *C01B 32/192* (2017.08); *C09D 5/24* (2013.01); *H01M 4/505* (2013.01); *H01M 4/5825* (2013.01); *H01M 4/62* (2013.01); *H01M 4/623* (2013.01); *H01M 10/052* (2013.01)

(58) Field of Classification Search
CPC . H01B 1/04; H01B 1/12; B82Y 30/00; B82Y 40/00; C01B 32/182
USPC .................................. 252/510, 511
See application file for complete search history.

(56) References Cited

U.S. PATENT DOCUMENTS

| | | | |
|---|---|---|---|
| 2009/0131575 A1* | 5/2009 | Handa ................. | B82Y 30/00 524/496 |
| 2013/0266859 A1 | 10/2013 | Todoriki et al. | |
| 2013/0302693 A1 | 11/2013 | Sun et al. | |
| 2014/0174495 A1* | 6/2014 | Nakaya ................. | H01L 35/32 136/204 |

FOREIGN PATENT DOCUMENTS

| | | | | |
|---|---|---|---|---|
| CN | 101793856 | | 8/2010 | |
| CN | 102738396 | | 10/2012 | |
| CN | 103137975 | | 6/2013 | |
| CN | 105968983 A | * | 9/2016 | ........... C09D 127/18 |
| GB | 778727 A | | 7/1957 | |
| WO | 2013135339 | | 9/2013 | |
| WO | 2013181994 | | 12/2013 | |

OTHER PUBLICATIONS

International Search Report and Written Opinion for International Application No. PCT/CN2015/072542, dated May 6, 2015, 12 pages.

Extended European Search Report for European Application No. 15749355.2, dated Jul. 7, 2017, 9 pages.

Zhang, K., et al., "Graphene/polyaniline nanofiber composites as supercapacitor electrodes," Feb. 23, 2010, pp. 1392-1401, vol. 22(4), Chemistry of Materials.

* cited by examiner

*Primary Examiner* — Tri V Nguyen
(74) *Attorney, Agent, or Firm* — RatnerPrestia

(57) ABSTRACT

Provided is a graphene composite primarily used as a conductive additive for forming an electrode for lithium ion batteries, which has performance equal to or higher than conventional dispersants and is deceased in cost by using an inexpensive and easily available dispersant. The graphene composite includes a graphene powder and a compound having a structure of pyrazolone.

7 Claims, No Drawings

GRAPHENE COMPOSITE, METHOD FOR PRODUCING GRAPHENE COMPOSITE AND ELECTRODE FOR LITHIUM ION BATTERY CONTAINING GRAPHENE COMPOSITE

CROSS-REFERENCE TO RELATED APPLICATIONS

This is the U.S. National Phase application of PCT International Application No. PCT/CN2015/072542, filed Feb. 9, 2015, and claims priority to Chinese Patent Application No. 201410050901.1, filed Feb. 14, 2014, the disclosures of each of these applications being incorporated herein by reference in their entireties for all purposes.

FIELD OF THE INVENTION

The present invention relates to a graphene composite, a method for producing a graphene composite, a conductive additive for lithium ion batteries containing the graphene composite, a paste for lithium ion batteries containing the graphene composite, and an electrode for lithium ion batteries containing the graphene composite.

BACKGROUND OF THE INVENTION

A lithium ion secondary battery has a higher capacity and a higher voltage than conventional secondary batteries such as a nickel-metal hydride battery and a nickel-cadmium battery, and has features of little self-discharge and memory effect-free. In recent years, the lithium ion secondary batteries are applied to various fields such as electrical products, transport equipment and aerospace, and with this situation, expectations for an increase in capacity and power of the lithium ion battery are growing.

An electrode active material of the lithium ion secondary battery has a very high theoretical capacity; however, it is difficult to charge/discharge at a battery capacity as high as the theoretical capacity. One of the causes is internal resistance within a positive electrode, and efforts are made to bring the battery capacity closer to the theoretical capacity by introducing a conductive additive into the positive electrode. A conductive additive which is chiefly used at present is carbon black. However, since the carbon black is amorphous carbon, the effect of improving the conductive property is not enough. Further, a carbon nanotube is investigated as a material having a higher conductive property, but it is exceedingly expensive.

Graphene is a material having a high conductive property, high heat conductivity and excellent flexibility, and in recent years, it particularly attracts attention. Graphene is a very thin material with a large specific surface area, and the number of graphene flakes per weight is large, and therefore it has high potential as a conductive additive in an electrode for a battery. However, since a graphene surface has a structure in which benzene rings link continuously, graphene flakes tend to stack through a π-π bond, and therefore it is difficult to well disperse graphene in a polar solvent. Accordingly, the graphene has a problem in dispersing in an electrode paste or a resin.

In order to improve the dispersibility of the graphene in polar solvent, investigations have been widely made concerning applying a surface treatment to the graphene. Methods of the surface treatment are divided broadly into a surface treatment of utilizing a covalent bond and a surface treatment of utilizing a dispersant to adhere to a graphene surface through a non-covalent bond.

In the former method, carboxyl groups, hydroxyl groups and epoxy groups on the graphene oxide become active sites of the reaction with surface treating agent. A new functional group is introduced into the graphene by reacting the surface treating agent with these active sites through a covalent bond. This method can improve the dispersibility by introduction of a new functional group, but it has a drawback of generating a structural defect of the graphene to reduce a conductive property.

In the latter method, it is possible to prevent graphene-graphene stacking while maintaining the conductive property of the graphene since the dispersant adsorbs on the surface of the graphene by interactions of a non-covalent bond such as a π-π interaction, a Van der Waals force and a hydrogen bond. For example, Non Patent Literature 1 describes that a perylene derivative is used as a dispersant. Further, as other dispersants, 6-amino-4-hydroxy-2-naphthalene, pyrene butyric acid and pyrene sulfonic acid, tetracyanonickelate benzoquinone and perylene diimide derivatives are publicly known (Non Patent Literatures 2 and 3). Moreover, Patent Literatures 1 and 2 disclose that aminopyrimidine and dopamine hydrochloride are used as the dispersants.

CITATION LIST

Patent Literature

[PTL 1]
WO 2013/181994 A
[PTL 2]
CN 103137975 B

Non Patent Literature

[NPL 1]
X. Zhang et al. Materials Science and Engineering C 33 (2013) 3851-3857
[NPL 2]
R. Hao et al. Chem. Commun., 2008, 6576-6578
[NPL 3]
S. Wang et al. ACS Nano., 2010, 6180-6186

SUMMARY OF THE INVENTION

However, the dispersants described in the citation list are expensive compounds, and therefore they have a problem that a production cost of the lithium ion secondary battery is significantly increased. It is an object of the present invention to provide a graphene composite which has performance equal to or higher than the graphene using those dispersants as mentioned above, and is deceased in cost by using an inexpensive and easily available dispersant.

The present inventors found that it is possible to impart a high conductive property and high dispersibility to the graphene powder by adopting a composite including a graphene powder and a compound having a structure of pyrazolone.

The graphene composite in the present invention can impart the dispersibility in a polar solvent while maintaining a high conductive property. Moreover, it becomes possible to provide an electrode for lithium ion batteries having excellent discharge performance by using such a graphene having high dispersibility and a high conductive property together with a binder and an electrode active material.

DETAILED DESCRIPTION OF EMBODIMENTS OF THE INVENTION

<Graphene Composite>

A graphene composite of the present invention includes a composite including a graphene powder and a compound having a structure of pyrazolone. In a preferred embodiment of the present invention, the graphene powder and the compound having a structure of pyrazolone are mixed with each other, and at least a part of the compound having a structure of pyrazolone exists in a state of adhering to the surface of the graphene powder.

[Graphene]

The graphene in embodiments of the present invention is a structural body in which one or several pieces of monolayer graphene are layered, and has a flake-like shape. A thickness of the structural body of graphene is not particularly limited, and it is preferably 100 nm or less, more preferably 50 nm or less, and moreover preferably 20 nm or less, and a lower limit of the thickness is preferably 0.3 nm or more, more preferably 1.0 nm or more, and moreover preferably 1.5 nm or more. A size in a plane direction of the graphene is not particularly limited; however, a lower limit of the size is preferably 0.5 µm or more, more preferably 0.7 µm or more, and moreover preferably 1 µm or more, and an upper limit is preferably 50 µm or less, more preferably 10 µm or less, and moreover preferably 5 µm or less. Herein, the size in a plane direction of the graphene refers to an average of the longest diameter and the shortest diameter of a surface of a graphene flake.

[Compound Having Structure of Pyrazolone]

The graphene composite in the present invention includes a compound having a structure of pyrazolone. The as described pyrazolone has a structure in which two nitrogen atoms are contained in an electronically conjugated five-membered ring. On the other hand, the graphene has a structure in which many in-plane benzene rings link continuously, and also has a high adsorptive property because of the tendency to cause a π-π interaction with an electronically conjugated cyclic compound. Further, the graphene obtained by reducing graphite oxide contains some acid functional groups such as a hydroxyl group, a carboxyl group and an epoxy group, and has high affinity for a compound containing nitrogen. Therefore, the structure of pyrazolone, which contains a plurality of nitrogen atoms and is an electronically conjugated cyclic compound, has exceedingly high affinity for the graphene. Moreover, since the structure of pyrazolone has an amide bond in its structure, it has high affinity for a polar solvent. As described above, the structure of pyrazolone combines the affinity for the graphene with the affinity for a polar solvent, and has a property suitable for dispersing the graphene in the polar solvent.

The two isomers for pyrazolone are 3-pyrazolone type and 5-pyrazolone type, which structures and positions are as shown in Chem. 1. In the structure of pyrazolone, we define the first position on the nitrogen atom next to the keto group, and the third position on the carbon atom near the second nitrogen atom.

[Chem. 1]

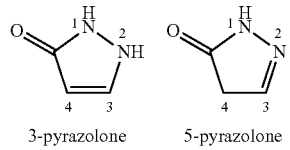

3-pyrazolone   5-pyrazolone

A compound having either structure can be used for the present invention; however, it is preferred to use a 3-pyrazolone type compound having more positions compared with 5-pyrazolone type compound for adding a functional group and easily enhancing the affinity for the graphene.

Further, the number of the structures of pyrazolone in the compound may be one or more (for example, two) in order to further enhance the affinity for the graphene.

As the compound having the structure of pyrazolone, it is preferred to be represented by the following general formula (A) or (B):

[Chem. 2]

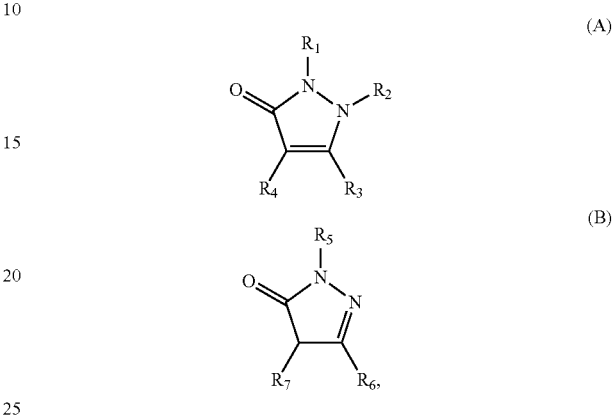

wherein any of $R_1$ to $R_7$ independently represents a hydrogen atom or any substituent group.

When any of $R_1$ to $R_7$ is a substituent group, the kind of the substituent group is not particularly limited; however, the substituent group preferably consists of 30 or less atoms to avoid impairing the affinity of the structure of pyrazolone for the graphene.

The compound having a structure of pyrazolone preferably has an aromatic group as a substituent group of the structure of pyrazolone in order to improve an adsorptive property to the graphene. That is, in the compound represented by the above general formula (A) or (B), preferably, at least one of $R_1$ to $R_4$ or at least one of $R_5$ to $R_7$ is an aromatic group. As the substituent aromatic group, a phenyl group and a naphthyl group are preferred since they are easily adsorbed on the graphene. In such a substituent aromatic group, the aromatic group may further have a substituent group. As the substituent group in this case, a sulfonic acid group, a carboxyl group, a ketone group, a hydroxyl group, an amino group, or a chloro group is preferably used from the viewpoint of enhancing the affinity for a polar solvent. Moreover, a sulfophenyl group or a chlorophenyl group is particularly suitably used since it has high affinity for the polar solvent. Further, the number of substituent aromatic groups in a molecule of the compound having a structure of pyrazolone may be one, or more (for example two) in order to further enhance the affinity for a graphene.

Since the substituent aromatic group can more improve the adsorptive property to the graphene when it is directly bonded to nitrogen serving as an adsorption site to the acid functional group of the graphene, the substituent aromatic group is preferably present at a first position or a second position of the structure of pyrazolone, and particularly preferably present at a first position of the structure of pyrazolone since an interaction with a ketone group (C=O) can be further effectively utilized. That is, in the compound represented by the above general formula (A) or (B), $R_1$, $R_2$ or $R_5$ is preferably an aromatic group, and $R_1$ or $R_5$ is particularly preferably an aromatic group.

Further, the compound having a structure of pyrazolone preferably has a methyl group and/or a carboxyl group as a substituent group of the structure of pyrazolone. That is, in the compound represented by the above general formula (A) or (B), preferably, at least one of $R_1$ to $R_7$ is a methyl group or a carboxyl group. The methyl group is a small sized functional group and is an electron-releasing substituent group.

Accordingly, the methyl group can efficiently donate electrons to the structure of pyrazolone with little steric hindrance, and consequently the affinity of the compound itself having a structure of pyrazolone for the graphene can be further enhanced. Further, the carboxyl group can enhance the affinity of the compound itself having a structure of pyrazolone for the graphene by electronic conjugation with the structure of pyrazolone. Further, the number of substituent methyl groups and/or substituent carboxyl groups in a molecule of the compound having a structure of pyrazolone may be one, or more (for example two) in order to further enhance the affinity for the graphene.

The substituent methyl group or substituent carboxyl group is preferred to substitute for the third-position of the structure of pyrazolone so that the structure of pyrazolone can have a higher affinity for the graphene. That is, in the compound represented by the above general formula (A) or (B), $R_3$ or $R_6$ is preferably a methyl group or a carboxyl group.

A compound having the above-mentioned substituent aromatic group and the substituent methyl group and/or substituent carboxyl group simultaneously is particularly preferred as a compound having a structure of pyrazolone to be used in the present invention.

The compound having a structure of pyrazolone in the present invention may have another substituent group other than the above-mentioned groups as a substituent group of the structure of pyrazolone as long as the substituent group does not interfere with the effect of the present invention. That is, in the compound represented by the above general formula (A) or (B), the compound may have another substituent group other than the above-mentioned groups in $R_1$ to $R_7$. As another substituent group, electron-releasing substituent groups are preferred, and specific examples thereof include an amino group, an alkylamino group, a dialkylamino group, a hydroxyl group, an alkoxy group, a chloro group, a bromo group, a iodo group, a nitro group, a cyano group, an aldehyde group, and a ketone group.

Among these groups, an amino group, an alkylamino group, a dialkylamino group, and a chloro group are more preferred in that the affinity of the compound itself having a structure of pyrazolone for the graphene is further enhanced, and an amino group, a methylamino group, and a dimethylamino group are particularly preferred because of small steric hindrance. Further, salts of these amino group, alkylamino group and dialkylamino group, that is, ammonium salts whose counterion is an anion of halogen (ammonium chloride, ammonium bromide, and ammonium iodide) are particularly preferred. Herein, as the anion of halogen, a chloride ion (ammonium hydrochloride) is particularly preferred since it hardly causes a steric hindrance.

Examples of a particularly preferred aspect of the compound having a structure of pyrazolone, that is, the compounds in which an aromatic group substitutes for a first position of the structure of pyrazolone, and a methyl group or a carboxyl group substitutes for a third position, include antipyrine (CAS: 60-80-0), aminopyrine (CAS: 58-15-1), 4-aminoantipyrine (CAS: 83-07-8), 1-phenyl-3-methyl-5-pyrazolone (CAS: 89-25-8), 4-benzoyl-3-methyl-1-phenyl-2-pyrazolin-5-one (CAS: 4551-69-3), 1-(2-chlorophenyl)-3-methyl-2-pyrazolin-5-one (CAS: 14580-22-4), 5-oxo-1-phenyl-2-pyrazolin-3-carboxylic acid (CAS: 119-18-6), 1-(2-chloro-5-sulfophenyl)-3-methyl-5-pyrazolone (CAS: 88-76-6), 1-(4-chlorophenyl)-3-methyl-2-pyrazolin-5-one (CAS: 13024-90-3), and 1-(4-sulfophenyl)-3-methyl-5-pyrazolone (CAS: 89-36-1), which are respectively represented by the following formula, and hydrochloride salts thereof.

[Chem. 3]

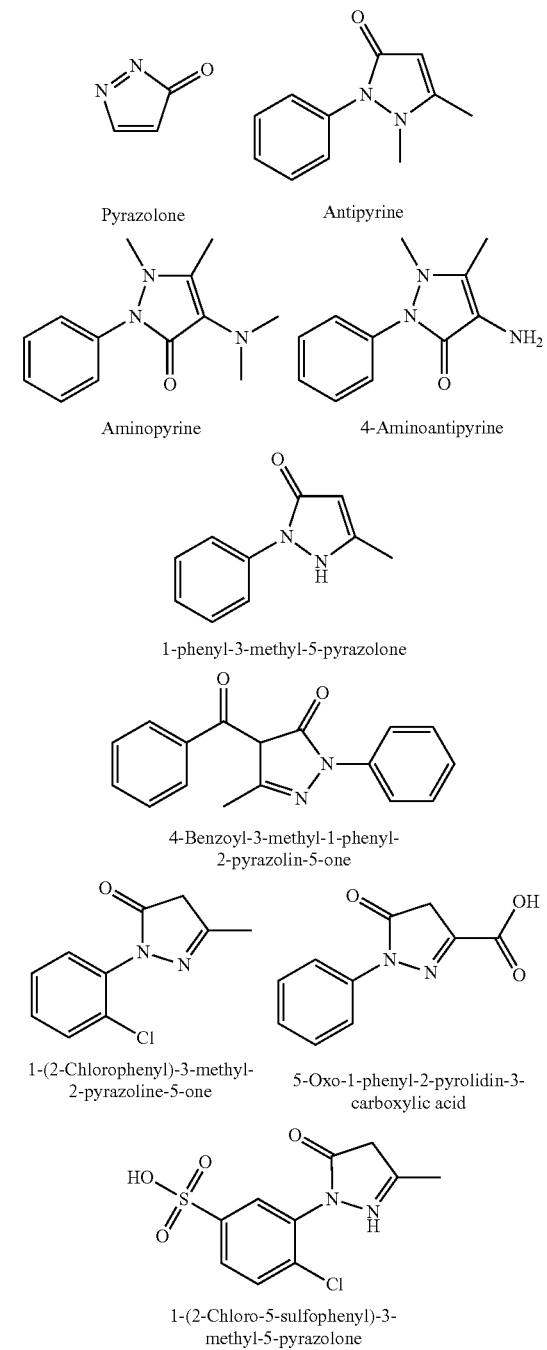

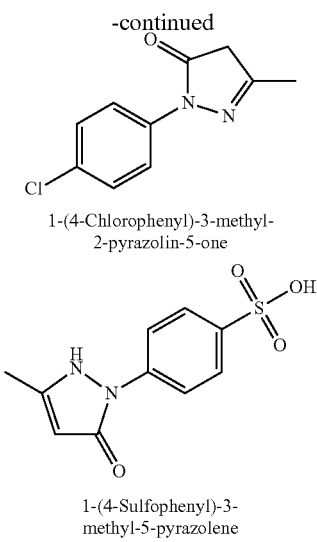

1-(4-Chlorophenyl)-3-methyl-
2-pyrazolin-5-one 1-(4-Sulfophenyl)-3-
methyl-5-pyrazolene Among these, antipyrine, aminopyrine, 4-aminoantipyrine and hydrochloride salts thereof (antipyrine hydrochloride, aminopyrine hydrochloride, and 4-aminoantipyrine hydrochloride) are particularly preferred.

The dispersibility of the graphene composite of the present invention is improved by interaction of a nitrogen atom in the structure of pyrazolone and an acid group such as a hydroxyl group or a carboxyl group in the graphene.

Consequently, the atomic ratio of nitrogen to carbon measured by X-ray photoelectron spectroscopy (XPS) becomes a parameter for the amount of the compound having a structure of pyrazolone coating on the graphene surface, and sometimes the excessively large ratio causes the conductive property to deteriorate and the excessively small ratio may cause the dispersibility to deteriorate. Therefore, the atomic ratio of nitrogen to carbon in the graphene composite of the present invention measured by X-ray photoelectron spectroscopy is preferably 0.010 or more and 0.080 or less, more preferably 0.020 or more and 0.070 or less, and particularly preferably 0.025 or more and 0.050 or less.

In the graphene composite of the present invention, since functional groups bonded to the graphene affect the dispersibility, the higher the atomic ratio of nitrogen to carbon is, the higher the dispersibility is. On the other hand, when the atomic ratio of nitrogen to carbon is excessively large, the conductive property may be deteriorated, therefore the atomic ratio of oxygen to carbon measured by XPS is preferably 0.01 or more and 0.10 or less, more preferably 0.03 or more and 0.08 or less, and particularly preferably 0.05 or more and 0.07 or less.

A weight ratio of the compound having a structure of pyrazolone to the graphene is not particularly limited; however, when the ratio of the compound having a structure of pyrazolone is excessively small, insufficient dispersibility might be imparted to the graphene powder. On the other hand, when the ratio of the compound having a structure of pyrazolone is excessively large, the conductive property of the graphene composite may be deteriorated. A ratio of the compound having a structure of pyrazolone in the graphene composite is preferably 10% by weight or more, and more preferably 15% by weight or more. Further, the ratio is preferably 30% by weight or less, and more preferably 25% by weight or less.

The fact that the compound having a structure of pyrazolone is contained in the graphene composite can be analyzed by using a TOF-SIMS method. In the TOF-SIMS method, a substance in the surface of a sample is analyzed by irradiating the sample surface placed in ultrahigh vacuum with pulsed ions (primary ions), and subjecting ions (secondary ions) released from the sample surface to mass analysis. When the graphene composite containing the compound having a structure of pyrazolone is analyzed by this technique, peaks derived from the compound having a structure of pyrazolone are obtained.

<Method for Producing Graphene Composite>

The graphene composite of the present invention can be produced by mixing a graphene powder and a compound having a structure of pyrazolone. A method of mixing the compound having a structure of pyrazolone and the graphene powder is not particularly limited, and a publicly known mixer or a kneading machine can be used for the mixing. Specific examples of the method include methods of using an automatic mortar, a triple roll mill, a bead mill, a planetary ball mill, a homogenizer, a planetary mixer, a twin screw kneader or the like.

The graphene composite of the present invention can also be produced by a method of reducing a graphite oxide in the presence of the compound having a structure of pyrazolone. This method is preferred since the compound having a structure of pyrazolone can be well adsorbed on the graphene. Hereinafter, the method of reducing a graphite oxide in the presence of the compound having a structure of pyrazolone will be described in detail.

[Graphite Oxide]

The graphite oxide in embodiments of the present invention is a kind of graphite which is oxidized, and it has a peak of 9 to 13.0° in X-ray diffraction measurement, which is a specific peak of graphite oxide. In such a graphite oxide, its structure collapses depending on the pH condition in dispersion, and the graphite oxide becomes graphene oxide with one to several layers depending on its oxidation degree.

A method of preparing the graphite oxide is not particularly limited, and a publicly known method such as a Hummers' method can be employed. Further, a commercially available graphite oxide may be purchased. The case where the Hummers' method is used to prepare graphite oxide in the present invention will be described below.

A graphite serving as a raw material of the graphite oxide may be either an artificial graphite or a natural graphite; however, the natural graphite is preferably used. The mesh number of the raw material graphite is preferably 300 to 20000, and more preferably 500 to 5000.

Graphite (black lead powder) and sodium nitrate are put in concentrated sulfuric acid, and potassium permanganate was added gradually while stirring the resulting mixture so as to avoid causing temperature rise, and the resulting mixture is stirred/reacted under temperatures of 25° C. to 50° C. for 0.2 to 5 hours. Thereafter the resulting mixture is diluted by adding deionized water to form a suspension, and the suspension is reacted at a temperature of 80° C. to 100° C. for 5 to 50 minutes. Finally, hydrogen peroxide and deionized water are added, and the resulting mixture is reacted for 1 to 30 minutes to obtain a graphite oxide dispersion. The obtained graphite oxide dispersion is filtered and washed to obtain a graphite oxide gel. A graphite oxide powder is obtained by removing the solvent from the graphite oxide gel by a lyophilization method, a spray drying method, or the like.

The respective reactants are added, as an example, in the rates of 150 to 300 ml of concentrated sulfuric acid, 2 to 8 g of sodium nitrate, 10 to 40 g of potassium permanganate and 40 to 80 g of hydrogen peroxide to 10 g of graphite. When sodium nitrate and potassium permanganate are added, the temperature is controlled by ice bath. When adding hydrogen peroxide, the mass of deionized water is ten to twenty times larger than that of hydrogen peroxide. A mass content of the concentrated sulfuric acid to be used is preferably 70% or more, and more preferably 97% or more.

Although graphite oxide has high dispersibility, it is insulating and cannot be used as conductive additive or the like. When the oxidation degree of the graphite oxide is too high, the conductive property of the graphene composite obtained by reduction may be deteriorated. Thus, the atomic ratio of oxygen to carbon in the graphite oxide is preferably 0.5 or less. If the graphite is not oxidized deep to its inside, the flake-like graphene composite would hardly be obtained by reducing the graphite oxide. Accordingly, it is preferred that the specific peak of graphite is not detected when analyzing the graphite oxide by an X-ray diffraction method.

[Reduction Step]

Although it is oxidized compared with graphene, graphite oxide contains a large amount of aromatic rings remaining, and therefore the compound having a structure of pyrazolone would easily adsorb on the graphite oxide. Therefore, when the graphite oxide is reduced in a state in which the graphite oxide and the compound having a structure of pyrazolone are mixed, it is possible to prepare a graphene composite on which the compound having a structure of pyrazolone is adsorbed well.

When the graphite oxide is reduced in the presence of the compound having a structure of pyrazolone, the reduction may be carried out in a state in which the compound having a structure of pyrazolone and the graphite oxide are moderately mixed. For example, the reduction may be carried out in a state in which the graphite oxide and the compound having a structure of pyrazolone are dispersed or dissolved in a solvent. In this case, both of the graphite oxide and the compound having a structure of pyrazolone are preferably completely dissolved in a solvent, but parts of them may remain as a solid without being dissolved. As the solvent, a polar solvent is preferred, and examples thereof, not limited to the following solvents, include water, ethanol, methanol, 1-propanol, 2-propanol, N-methyl-2-pyrrolidone, dimethylformamide, dimethylacetamide, dimethylsulfoxide, γ-butyrolactone and the like. Further, the solvent is not necessarily required as long as the graphite oxide and the compound having a structure of pyrazolone are moderately mixed, and the graphite oxide and the compound having a structure of pyrazolone may be mixed as-is solid by kneading.

Preferred examples of a reducing agent include sodium dithionite, potassium dithionite, sodium sulfite, potassium sulfite, sodium thiosulfate, potassium thiosulfate, phosphorous acid, sodium borohydride, iron powder, aluminum powder, hydrazine hydrate, sodium ascorbate, potassium ascorbate, ascorbic acid and the like. The reducing agent in the present invention is preferably an inorganic reducing agent in that hardly an oxide remains after reduction, and sodium dithionite, potassium dithionite, sodium sulfite, potassium sulfite, sodium thiosulfate, potassium thiosulfate, phosphorous acid, sodium borohydride, iron powder, aluminum powder and hydrazine hydrate are preferred as the reducing agent. Among these, sodium dithionite and potassium dithionite which can easily reduce the graphite oxide at ambient temperatures are particularly preferred.

An amount of the reducing agent is not particularly limited; however, a mass ratio between the reducing agent and the graphite oxide is preferably 1:1 to 3:1 since it is preferred to be able to adequately reduce the graphite oxide.

A concentration of the dispersion in which graphite oxide was reduced is not particularly limited; however, the concentration of graphite oxide is preferably 0.1 to 100 mg/ml.

A temperature of a dispersion in reducing the graphite oxide is not particularly limited; however, the temperature is preferably 40° C. or higher, and more preferably 50° C. or higher since if the temperature is too low, a progress of a reaction may become insufficient. When the concentration of the dispersion becomes nonuniform by evaporation of the solvent during the reduction, there is a possibility that a reduction reaction becomes nonuniform, and therefore the temperature is preferably 90° C. or lower, and more preferably 80° C. or lower.

A weight ratio of the compound having a structure of pyrazolone to the graphite oxide in reducing the graphite oxide is not particularly limited; however, the ratio is preferably 0.2 or more and 4 or less, and more preferably 0.5 or more and 2 or less since the ratio may has the effect on the amount with which the compound having a structure of pyrazolone remains on the graphene surface.

As described above, the graphene, which is obtained by reducing the graphite oxide in the presence of the compound having a structure of pyrazolone, has high dispersibility and can be suitably dispersed particularly in a polar solvent. Examples of a solvent suitable for dispersion include N-methyl-2-pyrrolidone, γ-butyrolactone, dimethylformamide, dimethylacetamide, carboxymethylcellulose and the like. Since the graphene composite has high dispersibility in these solvents, it can be preferably used as a material for a battery.

When carrying out the reduction in the presence of the compound having a structure of pyrazolone, a part of the compound having a structure of pyrazolone may be denaturalized; however, such a denaturalized product also contributes an improvement of a dispersion state. For example, when aminoantipyrine is used, sometimes a compound described below is produced. The existence of such a compound can be detected by TOF-SIMS.

[Chem. 4]

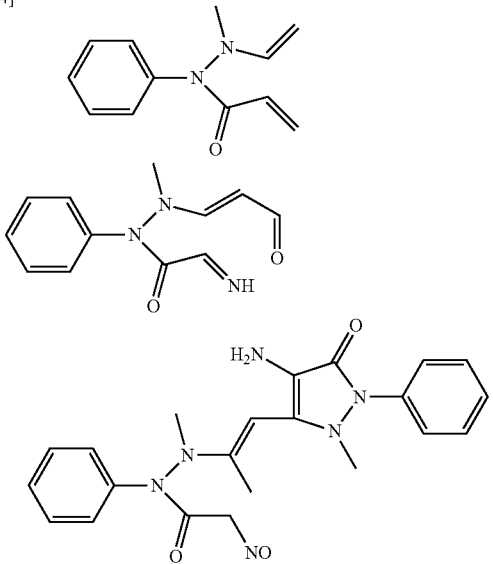

[Washing and Drying Step]

After undergoing the reduction step, a remaining surface treating agent and reducing agent are washed with solvent, and then the solvent is removed by lyophilization spray drying, or the like, finally drying is carried out, and thereby, a graphene composite can be obtained. A method of washing is not limited as long as a remaining component can be removed by the method, and washing can be performed by removing a supernatant by filtration or centrifugal separation after a reducing treatment, and repeating redispersion in solvent and filtration. A graphene composite can be obtained by removing water or solvent by drying methods including lyophilization, spray drying, or the like.

<Conductive Additive for Lithium Ion Batteries>

The conductive additive may be the graphene composite of the present invention alone, or another component may be further added to the graphene composite. The conductive additive which is further added is not particularly limited, and examples thereof include carbon black such as furnace black, Ketjen Black and acetylene black; graphite such as natural graphite (scale-like graphite, etc.) and artificial graphite; conductive fibers such as carbon fiber and metal fiber; and powder of metals such as copper, nickel, aluminum and silver.

<Electrode Paste for Lithium Ion Batteries>

The electrode paste for lithium ion batteries usually comprises active material of positive electrode or negative electrode, conductive additive, binder and solvent. Apart of the conductive additive of the present invention comprises as at least the graphene composite described above, and the conductive additive can be used for both negative electrode and positive electrode.

The positive active material is not particularly limited, and examples thereof include composite oxides of lithium and transition metal such as lithium cobaltate ($LiCoO_2$), lithium nickelate ($LiNiO_2$), spinel type lithium manganate ($LiMn_2O_4$), a ternary system in which a part of cobalt is replaced with nickel and manganese ($LiMn_xNi_yCo_{1-x-y}O_2$) and spinel type lithium manganate ($LiMn_2O_4$); olivine-based (phosphoric acid-based) active materials such as lithium iron phosphate ($LiFePO_4$) and lithium manganese phosphate ($LiMnPO_4$); metal oxides such as $V_2O_5$; and metal compounds such as $TiS_2$, $MoS_2$ and $NbSe_2$.

The negative active material is not particularly limited, and examples thereof include carbon-based materials such as a natural graphite, an artificial graphite and a hard carbon, the graphene composite of the present invention; silicon compounds in which SiO, SiC, or SiOC is a fundamental constituent element; metal oxides which is capable of a conversion reaction with lithium, such as manganese oxide (MnO) and cobalt oxide (CoO).

The binder may be selected from fluorine-based polymers such as polyvinylidene fluoride (PVDF) and polytetrafluoroethylene (PTFE); and rubbers such as styrene-butadiene rubber (SBR) and natural rubber.

The electrode paste for lithium ion batteries can be prepared by mixing the above-mentioned active material, binder and conductive additive with a moderate amount of solvent to prepare an electrode paste. Examples of the solvent include N-methyl-2-pyrrolidone, γ-butyrolactone, carboxymethylcellulose, dimethylacetamide and the like, and N-methyl-2-pyrrolidone is preferably used.

<Electrode for Lithium Ion Batteries>

The electrode for lithium ion batteries usually comprises current collector, active material of positive electrode or negative electrode, conductive additive, and binder. The conductive additive, positive active material, negative active material, conductive additive and binder are as described above. The current collector of positive electrode may be metal foil formed by aluminum and so on. The current collector of positive electrode may be metal foil formed by copper and so on.

The electrode for lithium ion batteries can be prepared by applying the electrode paste onto the current collector and drying the paste.

EXAMPLES

[Raw Material]

A natural graphite powder (1500 mesh) was purchased from Shanghai Yifan Graphite Co., Ltd.

Antipyrine, aminopyrine, 4-aminoantipyrine, 1-phenyl-3-methyl-5-pyrazolone, 4-benzoyl-3-methyl-1-phenyl-2-pyrazolin-5-one, 1-(2-chlorophenyl)-3-methyl-2-pyrazolin-5-one, 5-oxo-1-phenyl-2-pyrazolin-3-carboxylic acid, 1-(2-chloro-5-sulfophenyl)-3-methyl-5-pyrazolone, 1-(4-chlorophenyl)-3-methyl-2-pyrazolin-5-one, 1-(4-sulfophenyl)-3-methyl-5-pyrazolone, concentrated sulfuric acid, sodium nitrate, potassium permanganate, hydrogen peroxide, dopaminehydrochloride, sodium dithionite, potassium dithionite, hydrazine hydrate, and N-methyl-2-pyrrolidone were purchased from Sinopharm Chemical Reagent Co., Ltd or Aladdin Reagents Co., LTD.

The active material, the conductive additive and PVDF were purchased from the followings.

$LiFePO_4$: TATUNG CO $LiMn_2O_4$: Hohsen Corp.

Conductive additive: Denka (trade name: acetylene black, powder grade)

PVDF: ARKEMA K. K. (trade name: Kynar (registered trademark), HSV-900)

Measurement Example 1

X-ray Photoelectron Spectroscopy (XPS) Measurement

Measurement of X-ray photoelectron Spectroscopy of each sample was carried out by using Quantera SXM (Manufactured by Physical Electronics, Inc. (PHI)). The excitation source of X-ray is monochromatic Al Kα1 and Kα2 lines (1486.6 eV) with diameter set to 200 μm, and a photoelectron escape angle was set to 45°. Carbon element and nitrogen element in the graphene composite were detected, and an atomic ratio (N/C ratio) of nitrogen to carbon was determined from areas of detected peaks.

Measurement Example 2

Battery Performance Evaluation 100 parts by weight of lithium iron phosphate ($LiFePO_4$) or lithium manganate ($LiMn_2O_4$) as an electrode active material for lithium, 5 parts by weight of PVDF as a binder, 1.5 parts by weight of a conductive additive, and a moderate amount of N-methyl-2-pyrrolidone for viscosity adjustment were added to prepare an electrode paste. The electrode paste was applied onto an aluminum foil (thickness: 18 um) by using a doctor blade (300 μm) and dried at 200° C. for 15 minutes to prepare an electrode plate. The conductive additive was composed of 0.75 part by weight of carbon black and 0.75 part by weight of the graphene composite of the present invention. The thickness of positive electrode is about 50 μm.

The prepared electrode plate was cut out into a piece of 15.9 mm in diameter as a positive electrode, a lithium foil cut out into a size of 16.1 mm in diameter and 0.2 mm in thickness was used as a negative electrode, Celgard #2400 (manufactured by Celgard, LLC) cut out into a size of 17 mm in diameter was used as a separator, and a solvent composed of ethylene carbonate and diethylene carbonate in proportions of 7:3 containing LiPF6 with a concentration of 1M was used as an electrolyte to prepare a half cell of 2042 type coin battery, and battery's performance was evaluated.

When $LiFePO_4$ was used in the active material, an upper limit voltage was set to 4.0 V and a lower limit voltage was set to 2.5 V. When $LiMn_2O_4$ was used in the active material, an upper limit voltage was set to 4.3 V and a lower limit voltage was set to 3.0 V.

A charge rate was set to iC for each cycle, and a discharge rate was set to 0.1 C for a first and a second cycles, 0.5 C for a third and a fourth cycles, iC for a fifth and a sixth cycles, 3 C for a seventh and a eighth cycles, 5 C for a ninth and a tenth cycles, and 10 C for a eleventh and a twelfth cycles, and a discharge capacity in the twelfth cycle was determined.

[Preparation of Graphite Oxide]

A natural graphite powder (produced by Shanghai Yifan Graphite Co., Ltd.) of 1500 mesh was used as a raw material, and to 10 g of the natural graphite powder in an ice bath were added 220 ml of a 98% concentrated sulfuric acid, 3.5 g of sodium nitrate and 21 g of potassium permanganate, and the resulting mixture was mechanically stirred for 1 hour, and a temperature of a mixed liquid was maintained at 20° C. or lower. The mixed liquid was taken out from the ice bath, and stirred for 4 hours in a water bath at 35° C., and thereafter a suspension obtained by adding 500 ml of ion-exchange water was further reacted at 90° C. for 15 minutes. Finally, 600 ml of ion-exchange water and 50 ml of hydrogen peroxide were added, and the resulting mixture was reacted for 5 minutes to obtain a graphite oxide dispersion. The dispersion was filtered before it got cold, metal ions were washed with a dilute hydrochloric acid solution, the acid contained therein was washed repeatedly with ion-exchange water until a pH of water becomes 7 to prepare a graphite oxide gel. The element atomic ratio of oxygen to carbon of the prepared graphite oxide gel was 0.45. In the following Examples and Comparative Examples, the graphite oxide prepared by the present method was used.

Example 1

100 parts by weight of graphite oxide, 10 parts by weight of antipyrine, and 300 parts by weight of sodium dithionite were added to water, and the resulting mixture was maintained at 25° C. for 50 minutes while being stirred so as to be uniform. The resulting mixture was washed with ion-exchange water and ethanol and filtered. A wet cake obtained by filtration was lyophilized to obtain a graphene composite.

Example 2

100 parts by weight of graphite oxide, 28 parts by weight of aminopyrine, and 300 parts by weight of sodium dithionite were added to water, and the resulting mixture was maintained at 40° C. for 10 minutes while being stirred so as to be uniform. Thereafter, the resulting mixture was washed and filtered in the same manner as in Example 1 to obtain a graphene composite.

Example 3

100 parts by weight of graphite oxide, 27 parts by weight of 4-aminoantipyrine, and 300 parts by weight of sodium dithionite were added to water, and the resulting mixture was maintained at 35° C. for 10 minutes while being stirred so as to be uniform. Thereafter, the resulting mixture was washed and filtered in the same manner as in Example 1 to obtain a graphene composite.

Example 4

100 parts by weight of graphite oxide, 24 parts by weight of 1-phenyl-3-methyl-5-pyrazolone, and 300 parts by weight of sodium dithionite were added to water, and the resulting mixture was maintained at 85° C. for 15 minutes while being stirred so as to be uniform. Thereafter, the resulting mixture was washed and filtered in the same manner as in Example 1 to obtain a graphene composite.

Example 5

100 parts by weight of graphite oxide, 28 parts by weight of 5-oxo-1-phenyl-2-pyrazolin-3-carboxylic acid, and 300 parts by weight of sodium dithionite were added to water, and the resulting mixture was maintained at 45° C. for 50 minutes while being stirred so as to be uniform. Thereafter, the resulting mixture was washed and filtered in the same manner as in Example 1 to obtain a graphene composite.

Example 6

100 parts by weight of graphite oxide, 31 parts by weight of 1-(2-chloro-5-sulfophenyl)-3-methyl-5-pyrazolone, and 300 parts by weight of sodium dithionite were added to water, and the resulting mixture was maintained at 80° C. for 60 minutes while being stirred so as to be uniform. Thereafter, the resulting mixture was washed and filtered in the same manner as in Example 1 to obtain a graphene composite.

Example 7

100 parts by weight of graphite oxide, 29 parts by weight of 1-(4-chlorophenyl)-3-methyl-2-pyrazolin-5-one, and 300 parts by weight of sodium dithionite were added to water, and the resulting mixture was maintained at 35° C. for 60 minutes while being stirred so as to be uniform. Thereafter, the resulting mixture was washed and filtered in the same manner as in Example 1 to obtain a graphene composite.

Example 8

100 parts by weight of graphite oxide, 50 parts by weight of 1-(4-sulfophenyl)-3-methyl-5-pyrazolone, and 300 parts by weight of sodium dithionite were added to water, and the resulting mixture was maintained at 50° C. for 10 minutes while being stirred so as to be uniform. Thereafter, the resulting mixture was washed and filtered in the same manner as in Example 1 to obtain a graphene composite.

Example 9

100 parts by weight of graphite oxide, 5 parts by weight of antipyrine, 5 parts by weight of 4-aminoantipyrine, and 300 parts by weight of sodium dithionite were added to water, and the resulting mixture was maintained at 40° C. for 10 minutes while being stirred so as to be uniform. Thereafter, the resulting mixture was washed and filtered in the same manner as in Example 1 to obtain a graphene composite.

Example 10

100 parts by weight of graphite oxide, 30 parts by weight of antipyrine, and 300 parts by weight of sodium dithionite were added to water, and the resulting mixture was maintained at 40° C. for 10 minutes while being stirred so as to be uniform. Thereafter, the resulting mixture was washed and filtered in the same manner as in Example 1 to obtain a graphene composite.

Example 11

100 parts by weight of graphite oxide, 15 parts by weight of antipyrine, 15 parts by weight of 4-aminoantipyrine, and 300 parts by weight of sodium dithionite were added to water, and the resulting mixture was maintained at 40° C. for 10 minutes while being stirred so as to be uniform. Thereafter, the resulting mixture was washed and filtered in the same manner as in Example 1 to obtain a graphene composite.

Example 12

A graphene composite was obtained by washing and filtering the resulting mixture in the same manner as in Example 3 except for preparing and using an aqueous solution of 4-aminoantipyrine hydrochloride which was obtained by previously adding a 1M hydrochloric acid aqueous solution to 4-aminoantipyrine so as to be 3 times equivalent, and stirring the resulting mixture with graphite oxide and sodium dithionite for 1 hour in preparing a graphene composite in Example 3.

Comparative Example 1

100 parts by weight of graphite oxide, 5 parts by weight of aminopyrimide, 5 parts by weight of 4-aminoantipyrine, and, 300 parts by weight of sodium dithionite were added to water, and the resulting mixture was maintained at 50° C. for 60 minutes while being stirred so as to be uniform. Thereafter, the resulting mixture was washed and filtered in the same manner as in Example 1 to obtain a graphene composite.

Comparative Example 2

100 parts by weight of graphite oxide and 300 parts by weight of sodium dithionite were added to water, and the resulting mixture was maintained at 40° C. for 10 minutes while being stirred so as to be uniform. The resulting mixture was washed with ion-exchange water and ethanol and filtered. A wet cake obtained by filtration was lyophilized to obtain a graphene composite.

Comparative Example 3

100 parts by weight of graphite oxide, 30 parts by weight of dopamine hydrochloride, and 300 parts by weight of sodium dithionite were added to water, and the resulting mixture was maintained at 40° C. for 10 minutes while being stirred so as to be uniform. The resulting mixture was washed with ion-exchange water and ethanol and filtered. A wet cake obtained by filtration was lyophilized to obtain a graphene composite.

On the graphene composites prepared in Examples and Comparative Examples described above, the ratio of nitrogen to carbon was measured according to Measurement Example 1, and the battery performance was evaluated according to Measurement Example 2. The results of measurement are shown in Table 1.

All patent literatures and non-patent literatures cited herein are incorporated herein by reference. The citation list was shown prior to the section of "Summary of Invention".

TABLE 1

| | | Weight Ratio In Reduction Reaction Material (parts by weight) | | | Condition of Reduction | | XPS | Result of Battery Performance Evaluation (12th cycle) | |
| --- | --- | --- | --- | --- | --- | --- | --- | --- | --- |
| | | | | Reducing Agent (sodium dithionite) | Reaction | | Measurement N/C | | |
| | Kind of Dispersant | Dispersant | Graphite Oxide | | Reaction Temperature (° C.) | Reaction Time (minute) | (XPS) | $LiMn_2O_4$ | $LiFePO_4$ |
| Example 1 | Antipyrine | 10 | 100 | 300 | 25 | 50 | 0.019 | 22 | 52 |
| Example 2 | Aminopyrine | 28 | 100 | 300 | 40 | 10 | 0.041 | 40 | 85 |
| Example 3 | 4-Aminoantipyrine | 27 | 100 | 300 | 35 | 10 | 0.040 | 44 | 66 |
| Example 4 | 1-pheny-3-methyl-5-pyrazolone | 24 | 100 | 300 | 85 | 15 | 0.023 | 39 | 72 |
| Example 5 | 5-Oxo-1-phenyl-2-pyrazolin-3-carboxylic | 28 | 100 | 300 | 45 | 50 | 0.015 | 35 | 69 |
| Example 6 | 1-(2-Chloro-5-sul(ophenyl)-3-methyl-5-pyrazolone | 31 | 100 | 300 | 80 | 60 | 0.012 | 36 | — |
| Example 7 | 1-(4-Chlorophenyl)-3-methyl-2-pyrazolin-5-one | 29 | 100 | 300 | 35 | 60 | 0.016 | 29 | — |
| Example 8 | 1-(4-Sulfophenyl)-3-methyl-5-pyrazolone | 50 | 100 | 300 | 50 | 10 | 0.018 | 24 | — |
| Example 9 | Antipyrine + 4-Aminoantipyrine | 5 +5 | 100 | 300 | 40 | 10 | 0.026 | — | 78 |
| Example 10 | Antipyrine | 30 | 100 | 300 | 40 | 10 | 0.028 | 46 | 75 |
| Example 11 | Antipyrine + 4-Aminoantipyrine | 15 +15 | 100 | 300 | 40 | 10 | 0.035 | 48 | 88 |
| Example 12 | 4-Aminoantipyrine hydrochloride | 27 | 100 | 300 | 35 | 10 | 0.035 | 45 | 70 |

TABLE 1-continued

| | | Weight Ratio In Reduction Reaction Material (parts by weight) | | | Condition of Reduction | | XPS | Result of Battery Performance Evaluation (12th cycle) | |
|---|---|---|---|---|---|---|---|---|---|
| | | | | Reducing Agent (sodium dithionite) | Reaction | | | | |
| | Kind of Dispersant | Dispersant | Graphite Oxide | | Reaction Temperature (° C.) | Reaction Time (minute) | Measurement N/C (XPS) | $LiMn_2O_4$ | $LiFePO_4$ |
| Comparative Example 1 | Aminopyrimide | 5 | 100 | 300 | 50 | 60 | 0.008 | 0 | 0 |
| Comparative Example 2 | — | — | 100 | 300 | 40 | 10 | 0.000 | 0 | 0 |
| Comparative Example 3 | Dopamine hydrochloride | 30 | 100 | 300 | 40 | 10 | 0.013 | 8 | 15 |

What is claimed is:

1. A graphene composite including a graphene powder and a compound having a structure of pyrazolone selected from the group consisting of antipyrine, aminopyrine, 4-aminoantipyrine, 1-phenyl-3-methyl-5-pyrazolone, 4-benzoyl-3-methyl-1-phenyl-2-pyrazolin-5-one, 1-(2-chlorophenyl)-3-methyl-2-pyrazolin-5-one, 5-oxo-1-phenyl-2-pyrazolin-3-carboxylic acid, 1-(2-chloro-5-sulfophenyl)-3-methyl-5-pyrazolone, 1-(4-chlorophenyl)-3-methyl-2-pyrazolin-5-one, 1-(4-sulfophenyl)-3-methyl-5-pyrazolone and hydrochloride salts of these compounds, wherein at least a part of the compound having a structure of pyrazolone is adhered to a surface of the graphene powder.

2. The graphene composite according to claim 1, wherein the atomic ratio of nitrogen to carbon measured by X-ray photoelectron spectroscopy is 0.010 or more and 0.080 or less.

3. A conductive additive for a lithium ion battery electrode comprising at least a graphene composite according to claim 1.

4. A paste for a lithium ion battery electrode comprising at least the conductive additive for a lithium ion battery electrode according to claim 3, an active material and a binder.

5. An electrode for lithium ion batteries formed by using (1) a conductive additive comprising at least a graphene composite including a graphene powder and a compound having a structure of pyrazolone selected from the group consisting of antipyrine, aminopyrine, 4-aminoantipyrine, 1-phenyl-3-methyl-5-pyrazolone, 4-benzoyl-3-methyl-1-phenyl-2-pyrazolin-5-one, 1-(2-chlorophenyl)-3-methyl-2-pyrazolin-5-one, 5-oxo-1-phenyl-2-pyrazolin-3-carboxylic acid, 1-(2-chloro-5-sulfophenyl)-3-methyl-5-pyrazolone, 1-(4-chlorophenyl)-3-methyl-2-pyrazolin-5-one, 1-(4-sulfophenyl)-3-methyl-5-pyrazolone and hydrochloride salts of these compounds, wherein at least a part of the compound having a structure of pyrazolone is adhered to a surface of the graphene powder, or (2) the paste for a lithium ion battery electrode according to claim 4.

6. A method for producing a graphene composite comprising a step of reducing a graphite oxide in the presence of a compound having a structure of pyrazolone selected from the group consisting of antipyrine, aminopyrine, 4-aminoantipyrine, 1-phenyl-3-methyl-5-pyrazolone, 4-benzoyl-3-methyl-1-phenyl-2-pyrazolin-5-one, 1-(2-chlorophenyl)-3-methyl-2-pyrazolin-5-one, 5-oxo-1-phenyl-2-pyrazolin-3-carboxylic acid, 1-(2-chloro-5-sulfophenyl)-3-methyl-5-pyrazolone, 1-(4-chlorophenyl)-3-methyl-2-pyrazolin-5-one, 1-(4-sulfophenyl)-3-methyl-5-pyrazolone and hydrochloride salts of these compounds to form a graphene composite in which the compound having a structure of pyrazolone is adhered to a surface of graphene.

7. The method for producing a graphene composite according to claim 6, wherein as a reducing agent of the graphite oxide, one or more selected from sodium dithionite, potassium dithionite, sodium sulfite, potassium sulfite, sodium thiosulfate, potassium thiosulfate, phosphorous acid, sodium borohydride, iron powder, aluminum powder, hydrazinehydrate, sodium ascorbate, potassium ascorbate, and ascorbic acid is used.

* * * * *